Aug. 10, 1965
C. H. GIBSON
3,200,297
CONTROL UNIT HAVING REMOVABLE AND INTERCHANGEABLE
PROGRAMMING INSERTS
Filed May 18, 1962
3 Sheets-Sheet 1
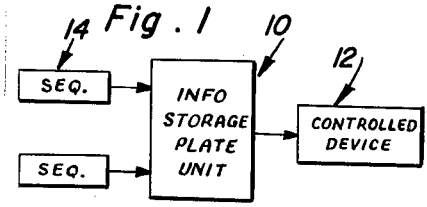
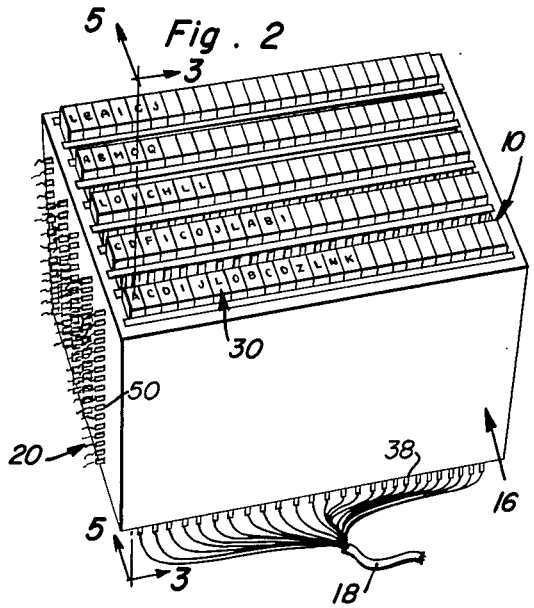
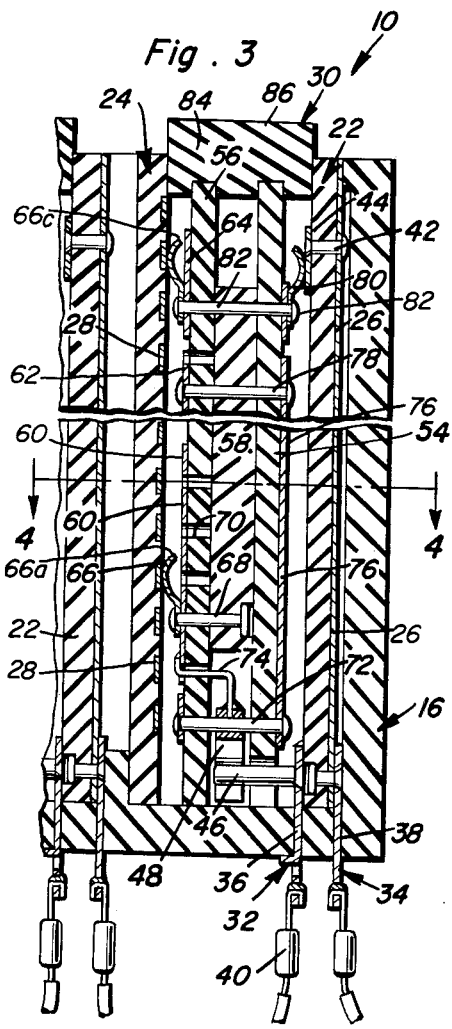
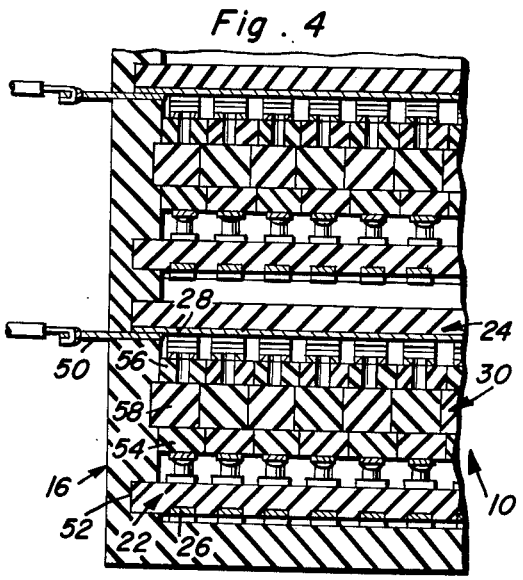
Charles H. Gibson
INVENTOR.
BY
Attorneys Aug. 10, 1965
C. H. GIBSON
3,200,297
CONTROL UNIT HAVING REMOVABLE AND INTERCHANGEABLE
PROGRAMMING INSERTS
Filed May 18, 1962
3 Sheets-Sheet 2
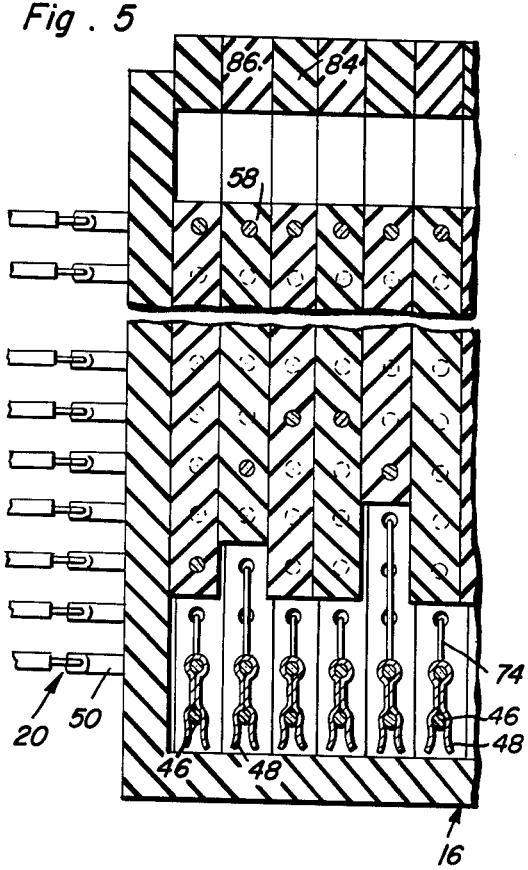
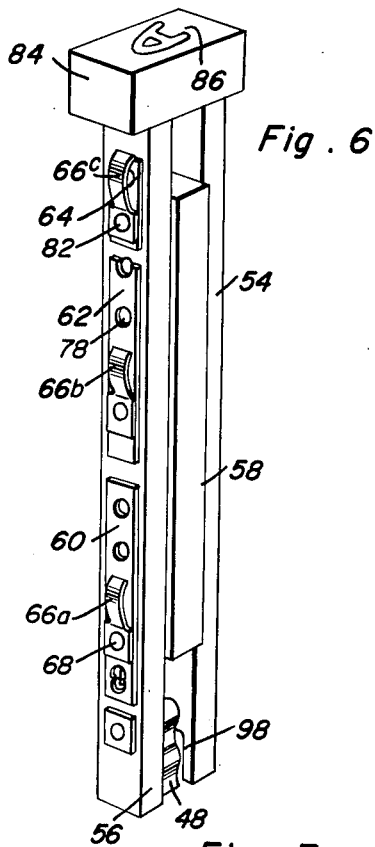
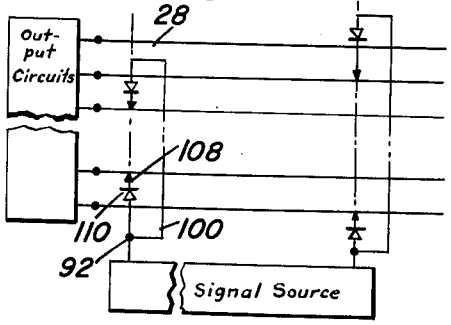
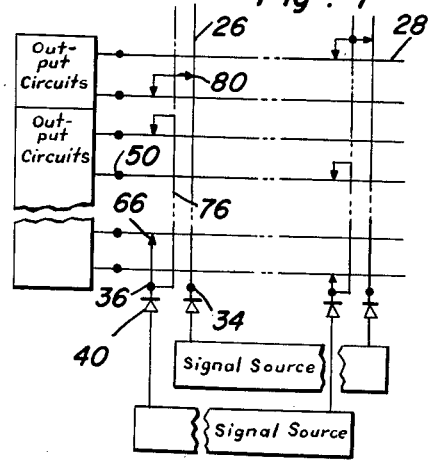
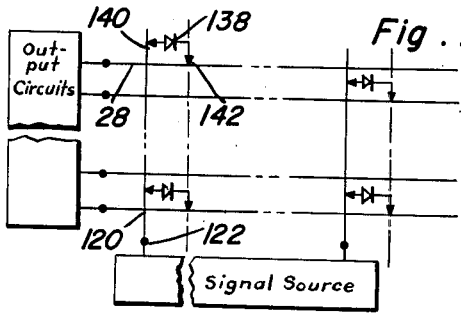
Charles H. Gibson
INVENTOR.
BY
Attorneys

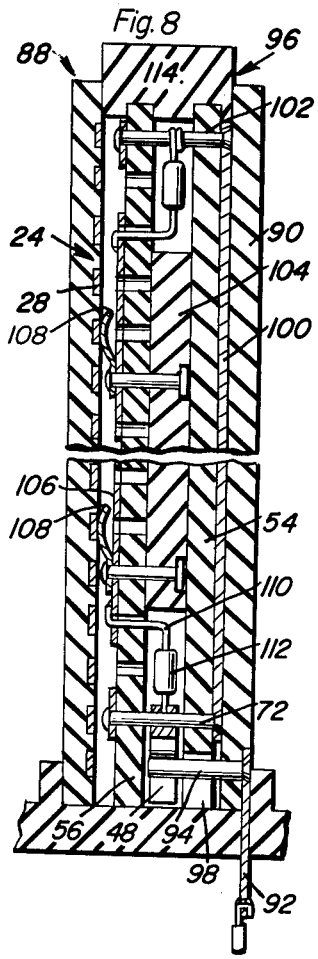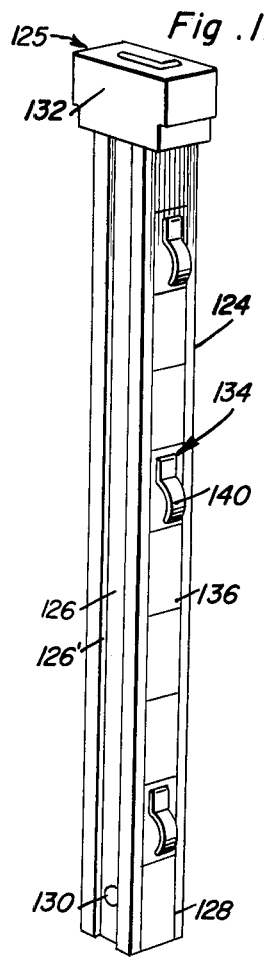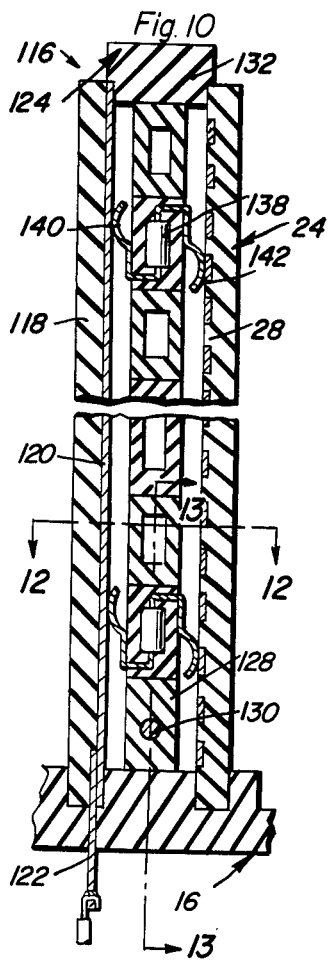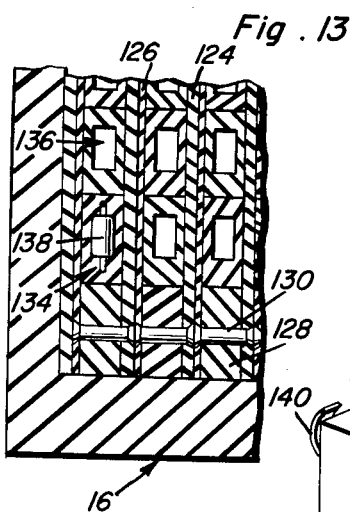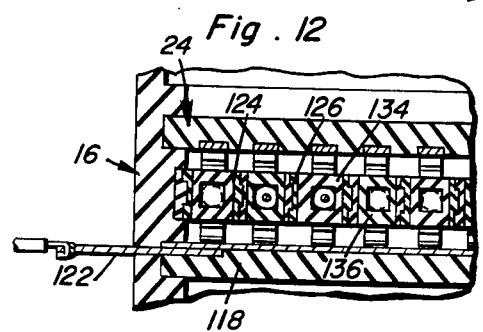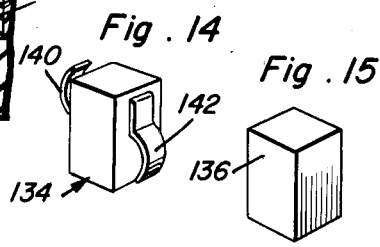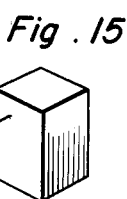

United States Patent Office 3,200,297
Patented Aug. 10, 1965

3,200,297
CONTROL UNIT HAVING REMOVABLE AND INTERCHANGEABLE PROGRAMMING INSERTS
Charles H. Gibson, Scarsdale, N.Y., assignor to Randac Systems, Inc., Troy, N.Y., a corporation of Delaware
Filed May 18, 1962, Ser. No. 195,713
9 Claims. (Cl. 317—101)

This invention relates to apparatus for the storage of information whereby automatic control is exercised over operations in connection with such machines as typewriters, calculators and other business machines. In particular, the invention is concerned with the manufacture and construction and programming of information storage units and in this respect represents an improvement in connection with the construction of apparatus such as disclosed in my prior Patent No. 2,981,395, issued April 25, 1961.

It is therefore a primary object of the present invention, to provide a new and useful construction for facilitating a change in the coding of information storage units in automatic control systems such as disclosed in the aforementioned patent.

Various constructional arrangements have been utilized in the art involving printed circuit plates containing parallel spaced conductors disposed in intersecting spaced relation to each other to form an information matrix with selected intersecting conductors on abutting circuit plates being interconnected by conductive rivets, each pair of plates thus being received within a holder in stacked relationship, for establishing selected circuits between a series of input terminals and output terminals in electrical contact with the parallel spaced conductors respectively printed on the interconnected plate members. Thus, an incoming signal current may be connected to selected output terminals in accordance with a predetermined coding arrangement for exercising some control function. In order to change the coding arrangement, it has heretofore been necessary to remove the interconnected circuit plate as a unit, the plate unit being either completely replaced or disassembled for re-establishing different connections between intersecting conductors thereon. Accordingly, permanent connections to the printed plates were not possible if any new programming was to be effected. Instead, the series of input and output terminals were necessarily mounted on the plate unit holder and separate pressure contacts with each of the conductors was necessary. The constructional arrangement of the present invention therefore provides for changing the information stored between the plate members of a printed plate unit in a more facile manner and involves a significant reduction in the number of electrical connectors necessary for such purpose by mounting the plate members of each circuit plate unit in confronting spaced relation to each other in contact with removable insert assemblies mounting pressure contact elements for establishing conductive paths between the selected intersecting conductors on the confronting plate members. Thus, the input and output terminals to the plate members may be permanently fixed to the plate members since information may be changed by merely replacing a removable insert assembly through which the selected connections between intersecting conductors on the plate members is established. The number of electrical connections that are disconnected in order to effect a change in coding, is thereby significantly reduced from that which was associated with prior arrangements requiring complete removal of the plate members out of contact with all of the input and output terminals with which the plate unit was associated.

A further object of the present invention involves the more convenient connection of diode elements in the electrical circuit established by the information storage units.

A still further object of the present invention is to provide an information storage unit comprising a pair of printed plate members at least one of which has a plurality of parallel spaced conductors printed thereon with which selected circuits are established by a plurality of removable insert assemblies disposed in slidable interfitted relation to each other between the confronting faces of the plate members for such purpose. A change may be effected in connection with the output circuits associated with one of the incoming signal lines without requiring removal and disassembly of an entire storage plate unit.

An additional object of the present invention is to provide a removable insert assembly for changing coded information established by selected electrical interconnections between printed circuit plate members by virtue of which arrangement, a plurality of series of input terminals may be permanently connected to the input plate member for receiving input signals from a plurality of sequences, stepping switches, scanners or other similar types of signal input devices.

Other objects of the present invention include the novel construction of a removable insert assembly associated with an information storage unit, which insert assembly may be readily reprogrammed and then reinserted in order to change information stored between printed circuit plate members.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic illustration of a typical system with which the apparatus of the present invention may be associated.

FIGURE 2 is a perspective view of a stacked arrangement of information storage units as one typical installation thereof.

FIGURE 3 is a partial sectional view taken substantially through a plane indicated by section line 3—3 in FIGURE 2, illustrating one of the information storage units.

FIGURE 4 is a partial sectional view taken substantially through a plane indicated by section line 4—4 in FIGURE 3.

FIGURE 5 is a partial sectional view taken substantially through a plane indicated by section line 5—5 in FIGURE 2.

FIGURE 6 is a perspective view of one of the removable insert assemblies associated with the apparatus illustrated in FIGURES 2 through 5.

FIGURE 7 is a schematic circuit diagram corresponding to the information storage unit illustrated in FIGURES 3 through 6.

FIGURE 8 is a partial sectional view similar to that of FIGURE 3 but illustrating a modified form of information storage unit.

FIGURE 9 is a schematic circuit diagram corresponding to the information storage unit as illustrated in FIGURE 8.

FIGURE 10 is a partial sectional view similar to FIGURE 3 illustrating another modified form of information storage unit.

FIGURE 11 is a perspective view of the removable insert assembly associated with the storage unit illustrated in FIGURE 10.

FIGURE 12 is a partial sectional view taken substantially through a plane indicated by section line 12—12 in FIGURE 10.

FIGURE 13 is a partial sectional view taken substantially through a plane indicated by section line 13—13 in FIGURE 10.

FIGURE 14 is a perspective view of a contact block element associated with the removable insert assembly of FIGURE 11.

FIGURE 15 is a dummy block element associated with the removable insert assembly of FIGURE 11.

FIGURE 16 is a schematic circuit diagram corresponding to the information storage unit as illustrated in FIGURES 10 through 15.

Referring now to the drawings in detail, it will be observed that an information storage plate unit generally referred to by reference numeral 10 may be utilized for automatic control of some control device 12 which may be in the form of a typewriter, calculator or other business machine. The input signals for the storage unit may be derived from a plurality of sequences 14 in the form of selector switches, scanning apparatus, stepping switches, gating or clock signals of computer equipment, etc. As shown in FIGURE 2, each of the information storage units may be installed in stacked relationship within some appropriate holder 16 each storage unit being fed with incoming signals by means of an input conductor 18 and issuing output signals to selected output terminals of a series of output terminals 20. The input conductor 18 may therefore include conductor connections to one or more series of input terminals. It will be appreciated of course, that the arrangement described may be varied in accordance with the control system with which the storage units are associated.

Referring now to FIGURES 3 through 6 in particular, it will be observed that each of the information storage units 10 includes a printed input circuit plate generally referred to by reference numeral 22 disposed in spaced relation to a printed output circuit plate generally referred to by the reference numeral 24.

Plate members 22 and 24 are made of non-conductive material and have printed thereon parallel spaced conductors. For example, the input plate member 22 has printed thereon a plurality of vertical conductors 26 which are non-conductively spaced from each other and disposed transversely or intersecting relation to a plurality of non-conductively spaced horizontal conductors 28 printed on the output plate member 24 so as to form therewith an information matrix. Slidably disposed between the confronting surfaces of the plate members 22 and 24, are a plurality of slidably interfitted removable insert assemblies generally referred to by reference numeral 30 arranged to establish selected electrical conductive paths from two series of input terminals 32 and 34 permanently connected to opposite sides of the input plate member 22 adjacent the bottom thereof for projection through the unit holder 16. Each series of input terminals 32 and 34 therefore includes spaced terminal elements 36 and 38 respectively connected as by soldering to diode elements 40 for restricting current flow to one direction from leads encased within the input cable 18. The terminal elements 38 of the series 34 are in electrical connection with the vertical conductors 26 printed on the input plate 22 on one side thereof, the upper end portion of the conductors 26 being connected by conductive rivets 42 to conductive strip elements 44. The other series 32 of input terminals 36 are respectively connected to terminal post elements 46 adapted to be contacted by an electrical connector clip 48 mounted at the lower end of the removable insert assembly 30 as hereinafter described when the assembly is inserted between the plate members 22 and 24. It will also be observed, that each of the horizontal conductors 28 on the output plate member 24, has permanently secured thereto, an output terminal element 50 projecting out of the holder 16 forming the output terminal series 20 to which electrical leads may be soldered for connection to output circuits in a control system. Spaced recesses 52 may be formed in the holder 16 for receiving the input and output plate members in proper spaced relation to each other for receiving therebetween the removable input assemblies 30. It will be apparent therefore, that the input and output plate members 22 and 24 once installed within the holder, are not to be removed since the input and output terminals thereof are soldered to the input and output leads. The removable insert assemblies 30 are the only portions removed for changing the coding or information to be stored.

Each of the removable insert assemblies is provided with a pair of narrow vertical assembly elements 54 and 56 made of non-conductive material and having disposed therebetween a non-conductive spacer element 58 terminating in spaced relation from the opposite ends of the assembly elements 54 and 56. Mounted on the side of the assembly element 56 exposed to the confronting surface of the output plate member 24, are a plurality of spaced conductor strips 60, 62 and 64. Each of the conductive strips has mounted at a selected location thereon, a spring pressure contact element designated collectively by numeral 66 by means of a rivet fastener 68 for example which extends through apertures 70 formed in the assembly element 56 in alignment with apertures on the conductive strips. Each of the pressure contact elements 66 is adapted to engage selected conductors 28 printed on the output plate member 24. Each of the pressure contact elements 66 is therefore connected in parallel with one another. For example, the contact lower and middle elements 66a and 66b associated with the lower and middle conductive strips 60 and 62 are electrically connected to the terminal element 36 while the contact element 66c associated with the upper conductive strip 64 is electrically connected with the terminal element 38, in the following manner. A conductive assembly rivet 72 extends between the assembly elements 54 and 56 adjacent the lower ends thereof to mount the connector clip 48 and also to establish an electrical connection therefrom to the conductive strip 60 by means of the lead 74 which extends between the assembly elements 54 and 56. A conductive strip 76 running lengthwise of the removable insert assembly is mounted on the element 54 of the insert assembly on the side opposite the conductive strips 60, 62 and 64. It establishes an electrical connection between the connector clip 48 via the bottom rivet 72 and a similar middle rivet 78 to the conductive strip 62.

An electrical connection to the contact element associated with the conductive strip 64 on the other hand, is established by means of the vertical conductor 26, the conductive rivet 42 and terminal 44 which contacts the pressure contact element 80 secured by the rivet 82 to the assembly element 54 and also establishing an electrical connection to the terminal strip 64 and contact element 66c thereon. It will therefore be apparent from the foregoing, that the insert assembly is maintained in assembled relation by means of the rivets 72, 78 and 82. It may be further held in assembled relation by means of an end cap portion 84 disposed at the upper end between the input and output plate members. The spacer element 58 disposed between the assembly elements 54 and 56 also be offset with respect to said elements in a lateral direction so as to form tongue and grooves with respect to adjacent removable insert assemblies for slidable interfitting therebetween as more clearly seen in FIGURE 4. Also, the upper end cap portion 84 may facilitate withdrawl of the removable insert assembly and also provide a labeling surface 86 by means of which the code information may be labeled.

Referring now to FIGURE 7, the electrical connection, established by the arrangment illustrated in FIGURES 3 through 6, will be apparent. It will also be apparent, that the removable insert arrangement described enables two series of input terminals to be connected to the input plate permanently and yet provide for reprogramming of the information stored by the matrix formed by the intersecting conductors 26 and 28.

Referring now to FIGURE 8, a modified form of storage unit 88 is illustrated. The construction of the output plate member and associated terminals remain the same. However, the removable insert assembly and input plate arrangement is different. It will be observed, that the input plate 90 is provided with a single series of input terminals 92 to which input leads are connected. Each of the input terminals 92 is connected to a projecting terminal post 94 adapted to be contacted by the spring connector clip 48 which remains unchanged on the modified form of removable insert assembly 96 which also includes the conductive assembling rivet 72 securing the connector clip 48 adjacent to the bottom of the insert assembly between the assembly elements 54 and 56 which also remain unchanged. Accordingly, the lower end of the assembly element 54 is notched at 98 so as to clear the terminal post 94 and is provided on one side thereof with a single continuous conductive strip 100 connected to the conductive rivet 72 at its lower end and to a conductive rivet 102 at the upper end holding the assembly elements 54 and 56 in assembled relation. A non-conductive spacer element 104 similar to the spacer element 58 is disposed between the assembly elements and is also disposed in offset relation thereto in order to form the tongue and groove interfitting arrangement described with respect to FIGURES 3 through 6. Further, the insulation assembly element 56 is provided on its face confronting the conductor 28, with a plurality of non-conductively spaced conductive strips 106. Each of the conductive strips has mounted thereon at a selected location, a spring contact element 108 similar to the arrangement described with respect to FIGURES 3 through 6. The lowermost conductive strip 106 is therefore connected to the connector clip 48 by means of a conductor lead 110 and a diode element 112 carried within the removable insert assembly between the assembly plates. The uppermost conductive strip is similarly connected by a second diode element to the conductive rivet 102 so as to establish a conductive path through the strip 100 and rivet 72 to the connector clip 48 which in turn is connected by the terminal post 94 to the input terminal 92. Thus, the spring contact elements 108 are connected in parallel to input terminal 92 for establishing parallel circuits to selected horizontal conductors 28 on the output plate 24. As more clearly seen in FIGURE 9, selected circuits are established between the input terminals 92 eliminating the connection of diode elements thereto since the diode elements are properly connected and carried within the removable insert elements themselves. Also, the input plate 90 need not have any vertical conductors printed thereon. Also, associated with the removable insert assembly 96, is an end cap portion 114 similar in construction and purpose to the end cap portion 84 described with respect to FIGURES 3 through 6.

Referring now to FIGURES 10 through 15, a third form of information storage unit 116 will be described. The unit 116 also includes an output plate member 24 identical to the output plate members associated with the information storage unit 10. The input plate member 118 on the other hand, is provided with a plurality of vertical parallel conductors 120 arranged to confront the conductors 28 on the output plate member, each of the vertical conductors 120 being electrically connected to a permanently secured input terminal 122 to which an input lead is connected. The removable insert assembly 124 is however considerably different from the insert assembly described with respect to the information storage units 10 and 88. The removable insert assembly 124 is provided with a pair of parallel side assembly members 124 and 126 respectively provided with a tongue and groove for slidable interfitting relation with adjacent removable insert assemblies. The assembly members 124 and 126 are interconnected adjacent the lower end thereof by means of an assembly block 128 held in assembled relation by means of the assembly rivet 130 while at the upper end, the end cap member 132 may space the members 124 and 126. The confronting surfaces of the members 124 and 126 are smooth and slidably receive therebetween a plurality of blocks including contact mounting blocks 134 and dummy blocks 136 as more clearly shown in FIGURES 14 and 15. Each of the contact mounting blocks 134 embeds therewithin a diode element 138 electrically connected to operatively directed spring pressure contact elements 140 and 142 which project into contact with the confronting surfaces of the input plate 118 and output plate 24. Accordingly, by placing a selected number of dummy blocks 136 between the contact mounting blocks, each of the vertical conductors 120 may be electrically connected to selected horizontal conductors 28 through diode elements 138. The removable insert assembly 116 may be therefore removed and the coding easily changed by changing the arrangement of th blocks 134 and 136 between the slidable assembly members 124 and 126. The circuits thus established, between the vertical conductors 120 and horizontal conductors 28 are more clearly illustrated in FIGURE 16. The advantages of the arrangement from a structural standpoint will however be readily apparent from the description in connection with FIGURES 10 through 15. Thus, the information storage unit 116 is similar to the unit 88 in that the diode elements are carried within the removable insert assembly itself but differs from the unit 88 in that it requires the provision of the vertical conductors 120 on the input plate in confronting relation to the horizontal conductors 28 on the output plate as distinguished from the arrangement of the units 88 wherein no vertical conductors are needed. However, the unit 116 is more readily changeable with respect to the insert assembly itself than that described with respect to the unit 88. Of course, the unit 116 involves a greater number of spring contact elements than that of unit 88. Also, it will be appreciated that the unit 10 has the advantage over the units 88 and 116 in that two series of input terminals may be utilized in connection therewith. Further, it is contemplated that different combinations of the various features and attributes associated with the different described forms of the invention may be made in accordance with installational requirements and desires.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An information storage device comprising a pair of non-conductive plate members disposed in parallel spaced relation to each other, a plurality of parallel spaced conductors printed on at least one of said plate members confronting the other plate member, a plurality of replaceable insert assemblies disposed between said pair of plate members, each insert assembly including spaced pressure-contact means projecting into contact with selected parallel conductors upon insertion between said plate members, a series of spaced conductor terminals adjacent the edge portions of each of said plate members, the printed conductors on one plate member being connected to the terminals adjacent its edge portion, means to establish an electrical connection between the series of terminals of the other plate member and said pressure-contact means when said assemblies are inserted, and means to establish unidirectional current paths between selected terminals on said one plate member and a terminal on the other plate member.

2. An information storage device as claimed in claim 1 wherein said parallel spaced conductors on one plate are transverse to the direction of insertive movement of said insert assemblies, and wherein those of the pressure-contact means which face such parallel spaced conductors on said one plate contact certain selected and predetermined conductors in inserted position of said assemblies, the conductors engaged being dependent on the position along said insert assemblies of said pressure contact means.

3. An information storage device as claimed in claim 1 wherein said insert assemblies are formed to slidably interfit with each other during insertion and while remaining inserted.

4. An information storage device comprising a pair of non-conductive plate members disposed in parallel spaced relation to each other, a plurality of parallel spaced conductors printed on each of said plate members, the plurality on one plate member being in exposed confronting relation to the plurality on the other plate member, a series of spaced conductor terminals adjacent the edge portions of each plate member, each series being connected to the conductors on its plate member, the conductors on one plate member being transverse to those on the other plate member, a plurality of replaceable insert assemblies disposed between said pair of plate members, each insert assembly including spaced pressure contact means projecting into contact with selected conductors on one of said plate members upon insertion between said plate members, and means to establish unidirectional current paths between selected terminals on said one plate member and a terminal on the other plate member.

5. The combination of claim 1 wherein diode elements are mounted within said insert assemblies and are electrically connected to said pressure contact means for restriction of the conductive paths established thereby to unidirectional current flow.

6. The combination of claim 1, wherein said pressure contact means comprises a plurality of non-conductively spaced conductive strips mounted on said insert assembly, a contact element secured at selected locations to each of said conductive strips for engagement with confronting printed conductors on said one plate member, connector means mounted on said insert assembly for electrical connection to an associated conductor terminal when said insert assembly is inserted between the plate members, and conductor means electrically connecting said connector means to each of said conductive strips.

7. In an information storage device having a plurality of printed circuit plate units positioned in stacked relationship for transmitting a plurality of incoming signal pulses to selected output circuits; each printed plate unit comprising a pair of non-conductive plate members disposed in parallel spaced relation to each other, a series of spaced conductor terminals permanently secured to each plate member adjacent respective edge portions on said plate members, at least one of said plate members having a plurality of parallel spaced conductors printed thereon in exposed confronting relation to the other of said plate members and electrically connected to the series of spaced terminals associated with said one plate member, and a plurality of replaceable insert assemblies disposed between the plate members of a unit, each replaceable insert assembly including assembly means for mounting said spaced pressure contact means and being in alignment with an associated conductor terminal on said other plate member and forming a slidable tongue and groove connection with adjacent insert assemblies, each replaceable insert assembly also including spaced pressure contact means projecting into contact with selected parallel spaced conductors printed on said one plate member upon insertion between said plate members, each pressure contact means comprising a plurality of non-conductively spaced conductive strips, a contact element secured at selected locations to each of said conductive strips for engagement with confronting printed conductors on said one plate member, connector means mounted on said insert assembly for electrical connection to an associated conductor terminal when said insert assembly is inserted between the plate members, and means electrically connecting said connector means to each of said conductive strips, and diode elements connected to each of said conductive strips and mounted on said insert assemblies to establish unidirectional current paths between selected conductor terminals on said one plate member and on the other plate member.

8. The combination of claim 7 wherein each insert assembly further includes an end cap portion exposed between said plate members having an information storage label corresponding to the selected conductor terminals with which electrically conductive paths are established.

9. In an information storage device having a plurality of printed circuit plate units positioned in stacked relationship for transmitting a plurality of incoming signal pulses to selected output circuits; each printed plate unit comprising a pair of non-conductive plate members disposed in parallel spaced relation to each other, a series of spaced conductor terminals permanently secured to each plate member adjacent respective edge portions on said plate members, at least one of said plate members having a plurality of parallel spaced conductors printed thereon in exposed confronting relation to the other of said plate members and electrically connected to the series of spaced terminals associated with said one plate member, and a plurality of replaceable insert assemblies disposed between the plate members of a unit, each replaceable insert assembly including spaced pressure contact means projecting into contact with selected parallel spaced conductors printed on said one plate member upon insertion between said plate members, said pressure contact means comprising a plurality of contact mounting blocks disposed within the insert assembly, dummy blocks positionable between selected contact mounting blocks separating the latter, each contact mounting block having a diode embedded therein and electrically connected to a pair of contact elements projecting from opposite sides of the mounting block, said diode establishing a unidirectional current path between a selected conductor terminal on one plate and a conductor terminal on the other plate.

References Cited by the Examiner

UNITED STATES PATENTS

| 1,647,697 | 11/27 | Hessel | 339—196 |
| 2,889,493 | 6/59 | Scal et al. | 339—17 |
| 2,916,721 | 12/59 | Adams | 317—99 |
| 2,929,042 | 3/60 | Guttridge et al. | 200—46 |
| 2,936,407 | 5/60 | Ewald | 317—101 |
| 3,002,169 | 9/61 | Kamm | 200—46 |

FOREIGN PATENTS

| 1,236,627 | 6/60 | France. |

DARRELL L. CLAY, *Primary Examiner.*

JOHN F. BURNS, *Examiner.*